Aug. 25, 1936.   A. J. FISHER   2,052,022
FLOW METER
Filed Nov. 10, 1932   2 Sheets-Sheet 1

INVENTOR.
Andrew J. Fisher,
BY John E. Hubbell
ATTORNEY.

Aug. 25, 1936.  A. J. FISHER  2,052,022
FLOW METER
Filed Nov. 10, 1932   2 Sheets-Sheet 2

INVENTOR.
Andrew J. Fisher
BY John E. Hubbell
ATTORNEY

Patented Aug. 25, 1936

2,052,022

UNITED STATES PATENT OFFICE 2,052,022

FLOW METER

Andrew J. Fisher, Sparrows Point, Md., assignor to The Brown Instrument Company, Philadelphia, Pa., a corporation of Pennsylvania Application November 10, 1932, Serial No. 641,964

20 Claims. (Cl. 73—208)

My present invention relates to flow meters which are adapted for insertion in a conduit to meter the flow therethrough, and which are of the known type comprising an orifice, and a floating piston or plunger which is moved to increase and decrease the effective flow area of said orifice as the flow varies and thereby maintains a predetermined and preferably constant differential between the fluid pressures at the inlet and outlet sides of the orifice with all rates of flow through the conduit.

The general object of the present invention is to provide an improved flow meter of the above mentioned type characterized by its mechanical simplicity and effectiveness.

A second and more specific object of the present invention is to provide a flow meter especially adapted for use in measuring the flow of a fluid such as fuel oil which is so viscous when cold that it must be heated above atmospheric temperatures to facilitate its passage through a conduit regardless of whether that conduit does or does not contain a meter. Oil when too viscous to flow freely through a conduit cannot be accurately measured in a flow meter of the above mentioned or other known type.

To adapt it for effective use in measuring the flow of a fluid like fuel oil which is heated to decrease its viscosity, I have devised my meter to maintain such temperature conditions therein as will prevent the fluid in any portion thereof from becoming so cool, and hence so viscous, as to interfere with the proper operation of the meter, while at the same time avoiding the maintenance of excessively high temperatures in portions of the meter where such high temperatures would be detrimental. To this end I have devised the meter to secure a constant but restricted transfer of heat from the main stream of heated fluid flowing through the meter to the fluid filled portion of the meter out of the direct path of flow through the latter and adjacent the portion of the meter which might be injuriously affected if subjected to the full temperature of said main stream which must be highly heated to continuously maintain a suitably high temperature and correspondingly low viscosity in all portions of its path of flow. The above mentioned heat transfer provisions are adequate in many cases to insure proper meter temperatures under all operating conditions. Advantageously and preferably, however, my improved meter is devised and designed for the addition of simple and effective auxiliary meter temperature controlling provisions when the use of such provisions is necessary or desirable.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of the invention.

Figure 1:
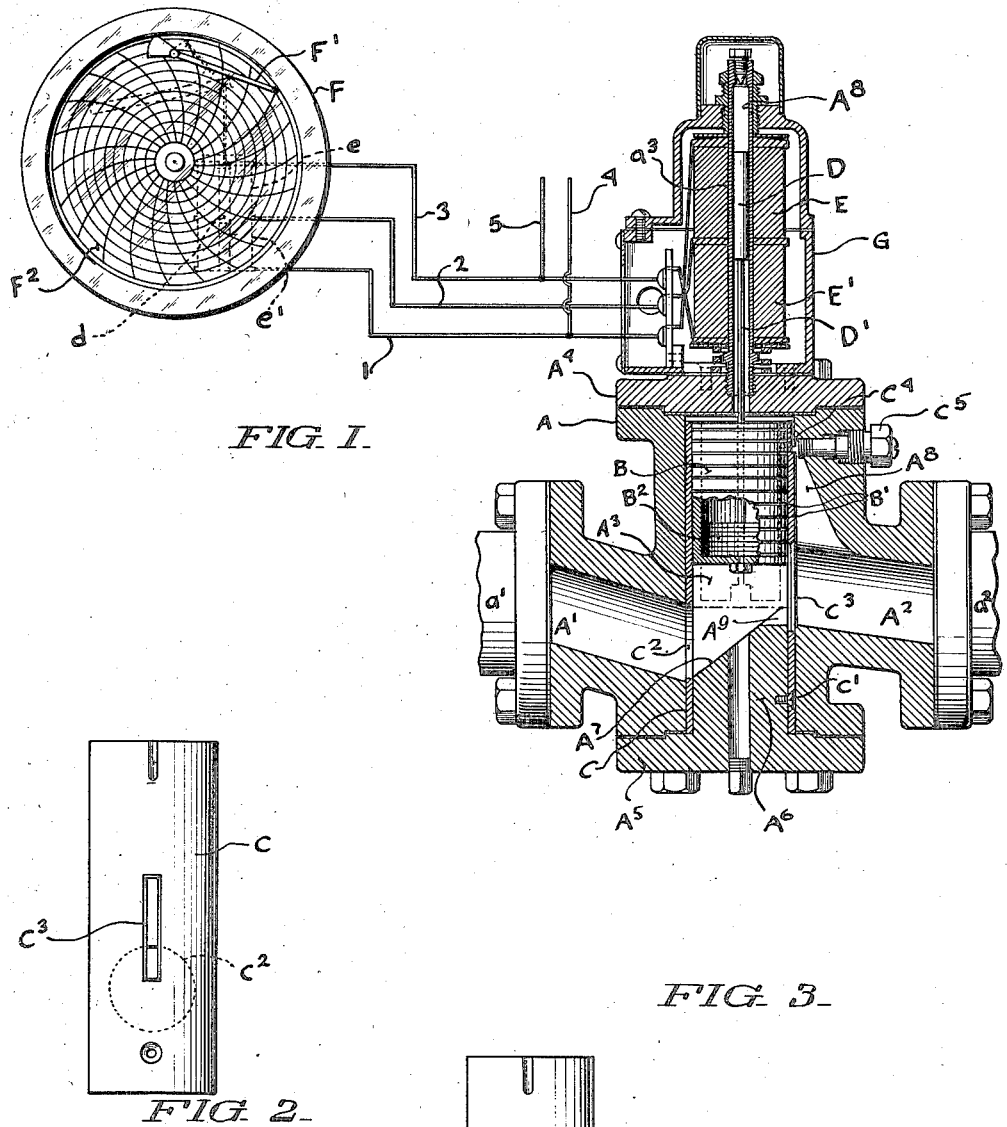
Fig. 1 is a view showing the meter proper in sectional elevation, and diagrammatically illustrating exhibiting means associated therewith.

The meter shown in Fig. 1 comprises a casing or body A adapted for connection between adjacent sections $a'$ and $a^2$ of a conduit through which the fluid to be metered flows. The casing A is formed with an inlet passage A' surrounded by a flange for the attachment of the adjacent flanged end of the conduit section $a'$, and formed with an outlet passage $A^2$ surrounded by a flange for the attachment of the adjacent flanged end of the conduit section $a^2$. Interposed between the adjacent ends of the passages A' and $A^2$ is a vertically disposed piston or plunger chamber $A^3$ containing a floating piston or plunger B.

The lateral wall of the chamber $A^3$ is advantageously formed by an open ended tubular member C, mounted in an open ended space formed in the casing body A, the upper and lower ends of said space being normally closed by upper and lower heads $A^4$ and $A^5$ bolted or screw connected to the casing body A. Advantageously and as shown the lower head $A^5$ comprises a plug or core portion $A^6$ extending into and filling the lower portion of the tubular member C which as shown is detachably secured to the head $A^5$ by a screw C'. The inlet chamber freely communicates with the lower end of the piston chamber $A^3$ above the core $A^6$ through a suitable port $C^2$ in the tubular member C. A vertically elongated measuring orifice $C^3$ formed in the tubular member C connects the chamber $A^3$ to the outlet passage $A^2$.

As shown, the inlet and outlet passages $A'$ and $A^2$ which have their remote ends substantially in horizontal alignment, are each inclined downwardly in the direction of the flow and the upper end $A^7$ of the core or plug part $A^6$ within the orifice member C, is inclined upwardly which contributes to desirable flow conditions through the flow passage including the inlet opening $C^2$, the space between the wall $A^7$ and the bottom of the plunger B, and the orifice $C^3$, particularly by insuring that the inlet portion of said passage is sufficiently large in cross section to avoid any objectionable throttling action therein.

The floating piston or plunger B is shown as in the form of a cup or hollow metal cylinder open at its upper end and having a flat closed lower end. To minimize leakage along the cylindrical joint between the piston B and the inner wall of the chamber $A^3$, while at the same time avoiding frictional resistance to movement of the piston, the latter is advantageously formed with circumferentially extending peripheral oil grooves $B'$.

The floating piston B rises and falls as the flow through the thoroughfare formed by the passages $A'$ and $A^2$ and the portions of the chamber $A^3$ and orifice $C^3$ beneath the piston increases and decreases, and thereby tends to maintain a practically constant difference between the pressures in the chamber $A^3$ and passage $A^2$, so that the flow through the orifice $C^3$ is a definite function of the area of the portion of the orifice $C^3$ beneath the lower end of the piston B. The pressure difference thus maintained depends on the weight of the piston B and the parts which it supports, and may be readily varied as required in calibrating the meter, as by placing a variable number of weights shown as thin discs $B^2$ inside of piston B.

In order that the portion of the chamber $A^3$ above the piston B may act as a dashpot space opposing objectionable oscillating movements of the piston, means are provided for a restricted flow of fluid into the said space from the main thoroughfare stream and a return flow from said space into said thoroughfare as the piston moves in response to decreases and increases in the thoroughfare stream flow. The means shown for this purpose comprise a notch or groove $C^4$ in the upper portion of the member C which connects the chamber $A^3$ to an upper portion $A^8$ of the outlet passage $A^2$. Flow through the grooved passage $C^4$ may be regulated by a manually adjustable valve member $C^5$ which is screw mounted in the casing body A.

As shown in Fig. 1, the means employed for exhibiting the variable position of the piston B, and thereby the variable flow through the meter, comprises a magnetic core D having a depending stem $D'$ coaxial with the piston B and secured in a central boss on the upper side of the bottom wall of the piston. The core D is axially received in a tube $a^3$ anchored at its lower end in the head $A^4$. The tube $a^3$ is closed at its upper end, but is open at its lower end to the dashpot space formed by the upper portion of the chamber $A^3$.

The core D forms the actuating element of an inductance bridge comprising a winding consisting of two end to end coils E and $E'$ surrounding the tube $a$, and two end to end coils $e$ and $e'$ forming a part of a distant exhibitor F. The latter comprises a deflecting member $F'$ connected by suitable linkage to a magnetic core $d$ axially movable in the coils $e$, $e'$. The inductance coils E, E, $e$, $e'$ may be electrically connected in various ways. In the arrangement shown, the adjacent terminals of the coils E and $E'$ are connected at the adjacent end of a conductor 2, the other end of which is connected to the terminals of the coils $e$ and $e'$ which are adjacent one another. The second terminal of the coil E is connected by a conductor 1 to the second terminal of the coil $e'$. Similarly, the second terminal of the coil $E'$ is connected by a conductor 3 to the second terminal of the coil $e$. 4 and 5 represent alternating current supply conductors, the conductor 4 being connected to the conductor 1, and the conductor 5, being connected to the conductor 3.

With the above described arrangement, any change in position of the piston B, and consequent change in position of the core D, unbalances the inductance bridge whereupon the electromagnetic interaction between the core $d$ and coils $e$ and $e'$ produces a corresponding movement of the core $d$, and thereby automatically rebalances the inductance bridge. The exhibitor F may be a simple indicating instrument, or may be a recording instrument having integrating provisions. As diagrammatically shown, the instrument F is a recording instrument of which the deflecting element $F'$ is the pen arm and $F^2$ is the record chart. The exhibitor F and the inductance bridge means by which the movements of the piston C are transmitted to the exhibitor, are not novel per se. On the contrary, they may be of the precise type disclosed in the Harrison Patent No. 1,743,852, which illustrates the use of such an inductance bridge in connection with the manometer of a flow meter of different type from that disclosed herein.

While there is thus no novelty in the mere use of an inductance bridge in a flow meter, certain special and practically important advantages are obtained by the use of such a bridge in association with the meter herein illustrated for use in measuring the flow of a fluid like fuel oil which ordinarily must be heated to a temperature of 200° F. or so to avoid objectionable viscosity. A temperature as high as 200° F. within the tube $a^3$ of the meter herein disclosed would be objectionable, because it would subject the winding surrounding the tube to an objectionably high temperature. Inasmuch, however, as the oil within the tube $a^3$ is relatively stagnant, its temperature will be appreciably below that of the oil in the main stream flowing through the meter. An oil temperature in the tube $a^3$ sufficiently below the main stream temperature to make the oil somewhat viscous is not prohibitive, however, because of the relatively small resistance to movement of the core D created by moderate viscosity of the oil within the tube $a^3$.

Moreover, while the temperature of the oil in the tube $a^3$ will be appreciably and desirably lower than the temperature of the main oil stream, the normally maintained oil in the tube $a^3$ is at a temperature well above that of the surrounding atmosphere by the heat transfer provisions incorporated in the meter shown in Fig. 1. Since in the arrangement disclosed, the tube $a^3$ is in free communication at its lower end with the dashpot space above the piston B, any reduction in the temperature of the oil within the tube $a^3$ appreciably below the temperature in the dashpot space results in a convection current circulation tending to minimize said reduction. While the oil in the dashpot space is relatively stagnant and tends to attain a temperature lower than that of the main oil stream, it is kept hot enough to act as a hot oil reservoir for heating the oil in the tube $a^3$ and to avoid a viscosity great enough to significantly interfere with the movements of the piston B, by the heat which it receives by conduction through the piston and casing. Such transfer of heat by conduction is augmented by the provision of the extension $A^8$ of the outlet passage $A^2$ along the upper portion of the chamber $A^3$ and separated from the latter by the corresponding thin wall portion of the tubular member C which may be made of good heat conducting metal. Moreover, while the oil in the dashpot space is relatively stagnant, it is not entirely so, as the normal rising and falling movements of the piston B are continually forcing oil back and forth between the dashpot space and the main flow thoroughfare through the passage $C^4$. Any small leakage between the piston B and member C also tends to augment the temperature in the dashpot space. The flow of current through the winding coils E and E' surrounding the tube $a^3$, subjects the latter to a heating effect the importance of which is enhanced by the enclosure of the winding within a casing G which also minimizes heat radiation losses to the external atmosphere from the tube $a^3$.

Figure 4:
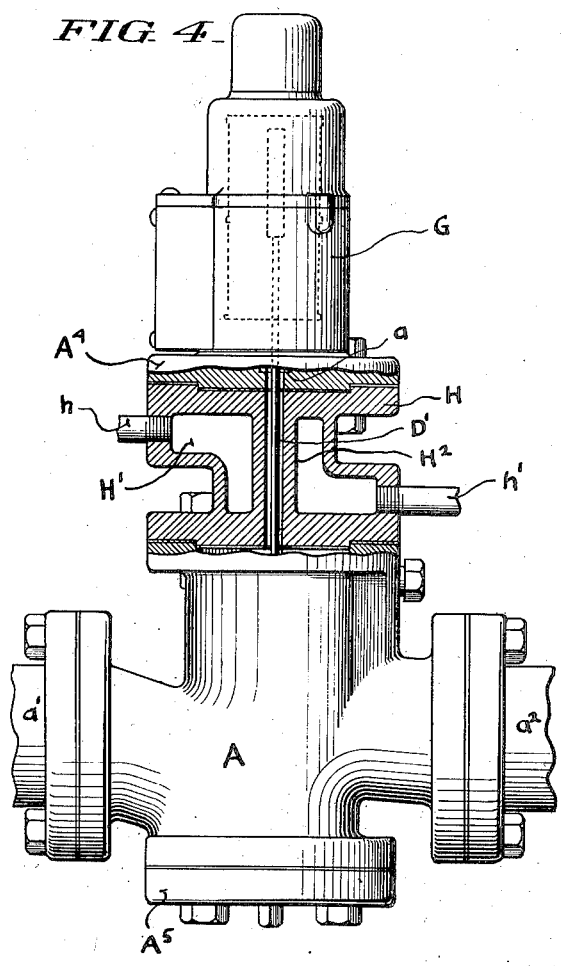
Fig. 4 is an elevation partly in section illustrating the application to the meter of Fig. 1, of special provisions for meter heating or cooling.

While no special meter temperature modifying provisions in addition to those shown in Fig. 1, are required in many cases, my improved meter is devised and adapted for the ready incorporation of means for obtaining an additional or auxiliary meter heating or cooling effect when such effect becomes desirable. Such means may take the form of a chambered member H interposed between the casing body A and upper casing head member $A^4$ as shown in Fig. 4. The chambered member H is shown as formed with a chamber space H' surrounding a thin walled tubular portion $H^2$ open at its upper end to the lower end of the tube $a$ and open at its lower end to the oil space within the casing A immediately above the plunger B. Conduits $h$ and $h'$ connected to the chamber space H' provide means for passing a temperature modifying fluid, which may be oil, air, steam or water as conditions make convenient or desirable, through the space H'. The temperature of the fluid so passed through the space H' may either be such as to exert a heating effect when this is desirable to reduce the viscosity of the oil in the tube $a$, or may be such as to exert a cooling effect on that oil when the high temperature of the main oil stream through the meter tends to maintain an objectionably high temperature within the tube $a$ and in the inductance bridge winding surrounding that tube.

Figure 5:
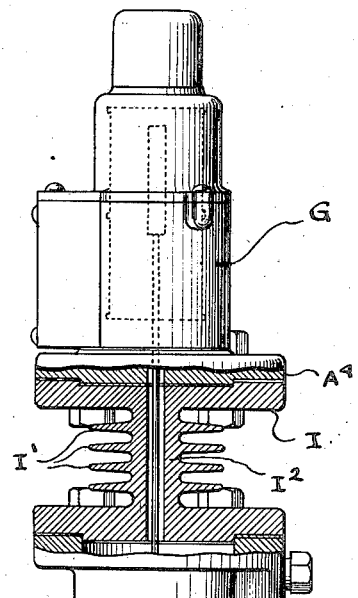
Fig. 5 is a view similar to Fig. 4 illustrating a modified form of meter cooling provisions.

When the only additional meter temperature modifying effect desired is a cooling effect, in lieu of the member H of Fig. 4, I may employ a member I interposed between the casing A and head $A^4$ as shown in Fig. 5. The member I comprises a tubular portion $I^2$ analogous to the portion $H^2$ of Fig. 4, but having its outer surface exposed to the atmosphere and advantageously formed with heat dissipating circumferential ribs or fins I'.

With the parts so arranged that the plunger B when in its lowermost position extends to the level of the bottom of the metering orifice $C^3$, the movements of the plunger will measure the flow for all values between the zero and maximum values of the flow. In cases in which the normal flow never falls below a certain minimum flow value, the meter may advantageously be arranged so that such minimum flow can occur with the plunger B in its lowermost position, thereby obtaining the benefit of the so-called "suppressed scale" effect obtained in other ways in various forms of measuring apparatus. In the construction shown in Fig. 1 this suppressed scale effect is obtained by extending the upper edge of the inclined face $A^7$ of the plug or core part $A^6$ suitably above the bottom of the orifice $C^3$ to serve as a stop suitably limiting the down movement of the piston B. A slot or notch $A^9$ formed in the upper edge portion of the part $A^6$ and in register with the lower portion of the orifice $C^3$, cooperates with the latter to fix the maximum flow through the meter which can occur without movement of the piston B upward from its lowermost position.

Figure 2:
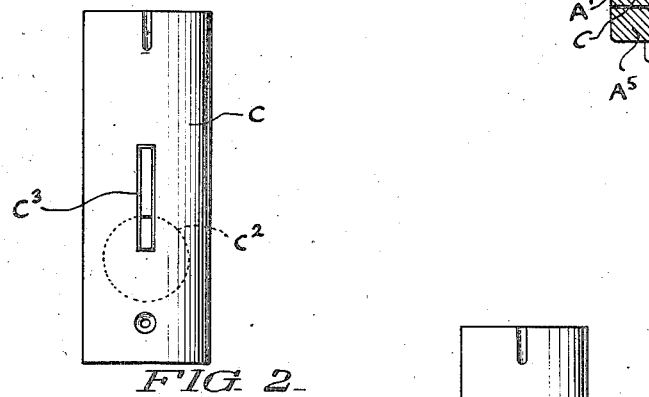
Fig. 2 is an elevation of the orifice member of the meter shown in Fig. 1.
Figure 3:
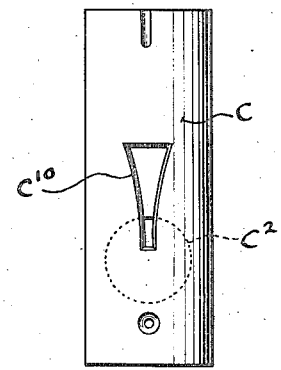
Fig. 3 is a view similar to Fig. 2 illustrating a modification of the orifice member in respect to the form of the orifice.

While in many cases the orifice $C^3$ is advantageously in the form of a narrow rectangular slot, as shown in Fig. 2, the orifice may have other forms. For example, the orifice may increase in width from bottom to top, as does the orifice $C^{10}$ shown in Fig. 3, to thereby make the relation between the change in the rate of flow and the movement of the piston as the flow increases more nearly constant than it is with the orifice $C^3$, and thus permit the use of a chart or scale more suitable in some cases than the chart or scale required with the orifice $C^3$. The orifice $C^{10}$ is shaped to make the area of the portion of the orifice below the piston increase in substantially linear proportion with the distance of the piston from the upper edge of the slot $A^9$ in the part $A^6$, as the piston moves upward from its position of engagement with said part.

As will be readily apparent to those skilled in the art, the meter construction illustrated is characterized by its mechanical simplicity and low inherent cost to manufacture. An especially advantageous feature of the construction is the formation of the measuring orifice in the removable cylinder member C which can easily be machined with the desired accuracy required both to insure a relatively close but frictionless fit of the floating piston B therein and to insure the proper orifice shape and dimensions. The attachment of said cylinder member C to the lower casing head member $A^5$ facilitates the accurate positioning of the member C within the casing body while permitting the ready assembly and disassembly of the structure when necessary or desirable for inspection, cleaning or repairs.

Figure 6:
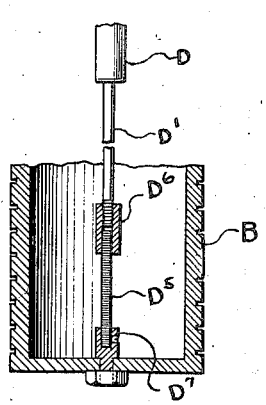
Fig. 6 is an elevation partly broken away and in section illustrating a modified form of plunger and armature connection.
Figure 6:
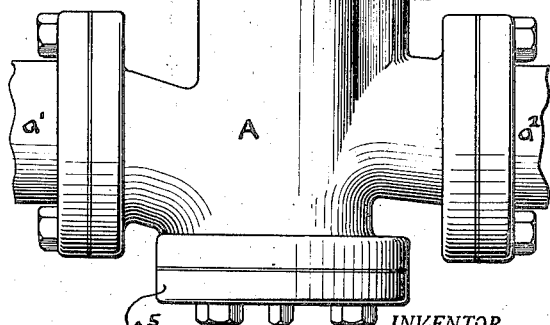

To insure the desired accuracy in a meter of the type disclosed herein, frictional resistance to the movement of the piston B and armature D should be wholly or practically eliminated. Inasmuch as the clearance between the armature D and tube $a^3$ is desirably made very slight, a rigid connection between the armature D and the piston B may cause the armature to rub against the tube $a^3$ on a very small departure from a perfect alignment of the parts, such as might develop in the assembly or reassembly of the parts even with high accuracy in the formation of the latter. Where especial care to avoid such a rubbing tendency, is desirable, I may make the connection between the armature and piston sufficiently flexible to permit such horizontal movement of the armature D relative to the piston B as is required to prevent the piston from forcing the armature into rubbing contact with the tube $a^3$ when the parts are not in perfect alignment. An adequate amount of flexibility in the connection between the armature and piston, may be secured, for example, with the special construction shown in Fig. 6, wherein the armature stem D' is connected to the piston B by a flexible shaft section D⁵ connected at its upper end to the lower end of the stem D' by a coupling D⁶, and connected at its lower end to a connecting part D⁷ bolted to the bottom wall of the piston B. The flexible shaft section D⁵ may be of any one of known constructions and in particular may be formed of helically wound wire with its helical convolutions closely spaced.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. In a flow meter for measuring the flow of a heated fluid which is viscous when cold, the combination with a meter casing having a vertically disposed piston chamber, an inlet opening to the lower end of said chamber and an outlet communicating with said chamber through a vertically elongated measuring orifice in the wall of said chamber, of a floating piston in said chamber moving up and down therein and thereby increasing and decreasing the free flow area through said orifice on increases and decreases in the fluid flow through the thoroughfare formed by said inlet, outlet, and the portions of said chamber and orifice below said piston, and means providing restricted communication between said thoroughfare and the upper portion of said chamber immediately above said piston whereby said portion forms a dashpot space which receives fluid from and returns it to said thoroughfare as said piston moves up and down and which receives heat from the fluid flowing through said thoroughfare by conduction through said piston and casing.

2. In a flow meter for measuring the flow of a heated fluid which is viscous when cold, the combination with a meter casing having a vertically disposed piston chamber, an inlet opening to the lower end of said chamber and an outlet communicating with said chamber through a vertically elongated measuring orifice in the wall of said chamber, of a floating piston in said chamber moving up and down therein and thereby increasing and decreasing the free flow area through said orifice on increases and decreases in the fluid flow through the thoroughfare formed by said inlet, outlet, and the portions of said chamber and orifice below said piston, and means providing restricted communication between said thoroughfare and the upper portion of said chamber immediately above said piston whereby said portion forms a dashpot space which receives fluid from and returns it to said thoroughfare as the piston moves up and down and which receives heat from the fluid flowing through said thoroughfare by conduction through said piston and casing, said thoroughfare comprising a portion above said orifice separated from the upper portion of said chamber by a thin heat conducting wall.

3. In a flow meter for measuring the flow of a heated fluid which is viscous when cold, the combination with a meter casing having a vertically disposed piston chamber, an inlet opening to the lower end of said chamber and an outlet communicating with said chamber through a vertically elongated measuring orifice in the wall of said chamber, of a floating piston in said chamber moving up and down therein and thereby increasing and decreasing the free flow area through said orifice on increases and decreases in the fluid flow through the thoroughfare formed by said inlet, outlet, and the portions of said chamber and orifice below said piston, means providing restricted communication between said thoroughfare and the upper portion of said chamber whereby said portion forms a dashpot space which receives fluid from and returns it to said thoroughfare as the piston moves up and down and which receives heat from the fluid flowing through said thoroughfare by conduction through said piston and casing, and means for exhibiting the movements of said piston comprising an upwardly extending tubular extension of said casing communicating at its lower end with the upper end of said chamber and closed at its upper end, a magnetic body in said space and connected to and moving with said piston and a current carrying winding surrounding said extension and in inductive relation with said body.

4. In a flow meter for measuring the flow of a heated fluid which is viscous when cold, the combination with a meter casing having a vertically disposed piston chamber, an inlet opening to the lower end of said chamber and an outlet communicating with said chamber through a vertically elongated measuring orifice in the wall of said chamber, of a floating piston in said chamber moving up and down therein and thereby increasing and decreasing the free flow area through said orifice on increases and decreases in the fluid flow through the thoroughfare formed by said inlet, outlet and the portions of said chamber and orifice below said piston, means providing restricted communication between said thoroughfare and the upper portion of said chamber whereby said portion forms a dashpot space which receives fluid from and returns it to said thoroughfare as the piston moves up and down and which receives heat from the fluid flowing through said thoroughfare by conduction through said piston and casing, and means for exhibiting the movements of said piston comprising an upwardly extending tubular extension of said casing communicating at its lower end with the upper end of said chamber and closed at its upper end, a magnetic body in said space and connected to and moving with said piston, a current carrying winding surrounding said extension and in inductive relation with said body, and means enclosing, and thereby minimizing heat losses by, said winding and extension.

5. In a flow meter for measuring the flow of a heated liquid which is viscous when cold, the combination with a meter casing having a vertically disposed piston chamber open at its upper end and having an inlet opening to the lower end of said chamber and an outlet communicating with said chamber through a vertically elongated measuring orifice in the wall of said chamber, of a casing part detachably secured to said casing and closing the upper end of said chamber and including an uprising tubular extension coaxial with said chamber and open at its lower end to the upper end of said chamber and closed at its upper end, of a floating piston in said chamber moving up and down therein and thereby increasing and decreasing the free flow area through said orifice on increases and decreases in the fluid flow through the thoroughfare formed by said inlet, outlet, and the portions of said chamber and orifice below said piston, means providing restricted communication between said thoroughfare and the upper portion of said chamber whereby said portion forms a dashpot space which receives fluid from and returns it to said thoroughfare as said piston moves up and down and which receives heat from the fluid flowing through the thoroughfare by conduction through said piston and casing, a magnetic body in said uprising extension and connected to and moving with said piston, and a current carrying winding surrounding said extension and in inductive relation with said body.

6. In a flow meter, the combination with a meter casing formed with a vertically disposed piston chamber, an inlet opening to the lower end of said chamber and an outlet communicating with said chamber through a vertically elongated measuring orifice in the wall of said chamber, of a floating piston in said chamber moving up and down therein and thereby increasing and decreasing the free flow area through said orifice on increases and decreases in the fluid flow through the thoroughfare formed by said inlet, outlet, and the portions of said chamber and orifice below said piston, means enclosed and rigidly mounted within said casing and limiting the down movement of said piston to maintain a predetermined minimum free flow area through said orifice at all times, and a meter scale and an indicating device cooperating with said piston to indicate on said scale the position of said piston and thereby indicate the rate of said fluid flow, said scale having a scale marking corresponding to the flow range of up and down movement of the piston.

7. In a flow meter, the combination with a casing having a vertically disposed piston chamber and a vertically elongated measuring orifice outlet from said chamber and an inlet to the lower end of said chamber, of an elongated hollow floating piston closed at its lower end and moving up and down in said chamber, and thereby increasing and decreasing the free flow area through said orifice as the flow through said chamber increases and decreases as required to maintain a substantially constant proportion between the weight of said piston and the fluid pressure drop in said orifice, said hollow piston containing in its lower portion weighting material adjustable in amount to thereby vary the difference which said piston tends to maintain between the fluid pressure beneath the piston and the fluid pressure at the outlet end of said orifice and said hollow piston being open at its top for the insertion and removal of weighting material.

8. In a flow meter, the combination with a chambered casing body having inlet and outlet passages and a chamber space between said passages and comprising a lower cylindrical portion open at one side to said inlet passage, of a vertically disposed tubular member removably mounted in said space and comprising a lower portion fitting in said cylindrical space portion and formed with a lateral port in register with said inlet passage, and with a vertically elongated measuring orifice in its wall opening to said outlet passage between upper and lower levels respectively above the levels of the upper and lower edges of said port, and an imperforate floating piston fitting in said member and rising and falling to thereby increase and decrease the free flow area through said orifice as the flow through the meter increases and decreases, as required to maintain a substantially constant proportion between the weight of said piston and the fluid pressure drop in said orifice.

9. In a flow meter, the combination with a casing having a vertically disposed piston chamber and a vertically elongated measuring orifice outlet from said chamber at one side of the latter and a bottom wall for said chamber upwardly inclined toward said orifice and an inlet to said chamber above and adjacent the low side of said bottom wall and having an inlet passage leading toward said inlet and an outlet passage leading away from said orifice outlet, with the inlet end of said inlet passage and the outlet end of said outlet passage substantially coaxial and with each of said passages downwardly inclined in the direction of flow therethrough, of a floating piston in said chamber moving up and down therein and thereby increasing and decreasing the free flow area through said orifice as the flow through said passages increases and decreases.

10. In a flow meter, the combination with a casing having a vertically disposed piston chamber and a vertically elongated measuring orifice outlet from said chamber at one side of the latter and a bottom wall for said chamber upwardly inclined toward said orifice and an inlet to said chamber above and adjacent the low side of said bottom wall, of a floating piston in said chamber moving up and down therein and thereby increasing and decreasing the free flow area through said orifice as the flow through said chamber increases and decreases.

11. In a flow meter, the combination with a casing body formed with inlet and outlet passages and an interposed chamber space open at its lower end, of a casing part detachably secured to said body and closing the lower end of said space and having at its upper side an uprising projection, a vertically disposed tubular portion mounted on said part with its lower end surrounding said projection, said member extending into said chamber space and being formed with an inlet opening communicating with said inlet passage and with a vertically elongated measuring orifice opening to said outlet passage, said projection including a portion projecting above, but not preventing flow through, the lower portion of said orifice, and a floating piston in said tubular member moving up and down therein to thereby increase and decrease the free flow area through said orifice as the flow between said passages increases and decreases, but prevented by said portion from moving downward far enough to eliminate all free flow area through said orifice.

12. In a flow meter, the combination with a casing body formed with inlet and outlet passages and an interposed chamber space open at its bottom, of a casing part detachably secured to said body and closing the lower end of said space and having at its upper side an uprising projection, a vertically disposed tubular member mounted on said part with its lower end surrounding said projection, said member extending into said chamber space and being formed with an inlet opening communicating with said inlet passage and with a vertically elongated measuring orifice opening to said outlet passage, a floating piston fitting in said tubular member and rising and falling to thereby increase and decrease the free flow area through said orifice as the flow between said passages increases and decreases, means providing a restricted flow path between the space within said member above said piston and the flow thoroughfare including said passages, port and orifice, and a valve regulating flow through said restricted flow path.

13. In a flow meter, the combination with a casing body formed with inlet and outlet passages and an interposed chamber space open at its lower end, of a casing part detachably secured to said body and closing the lower end of said space and having at its upper side an uprising projection, a vertically disposed tubular member mounted on said part with its lower end surrounding said projection, said member extending into said chamber space and being formed with an inlet opening communicating with said inlet passage and with a vertically elongated measuring orifice opening to said outlet passage, and a floating piston fitting in said tubular member and rising and falling to thereby increase and decrease the free flow area through said orifice as the flow between said passages increases and decreases, as required to maintain a substantially constant proportion between the weight of said piston and the pressure drop in said orifice and in its minimum flow position, engaging and being supported by said projection.

14. In a flow meter, the combination with a casing body formed with inlet and outlet passages and an interposed chamber space open at its lower end, of a casing part detachably secured to said body and closing the lower end of said space and having at its upper side an uprising projection, a vertically disposed tubular member mounted on said part with its lower end surrounding said projection, said member extending into said chamber space and being formed with an inlet opening communicating with said inlet passage and with a vertically elongated measuring orifice opening to said outlet passage, the upper end of said projection being inclined to the horizontal upwardly toward said orifice and a floating piston fitting in said tubular member and rising and falling to thereby increase and decrease the free flow area through said orifice as the flow between said passages increases and decreases, and having its lower end in proximity to the upper end of said projection when said flow is relatively small.

15. In a flow meter, the combination with a casing body formed with inlet and outlet passages and an interposed chamber space open at its bottom, of a casing part detachably secured to said body and closing the lower end of said space and having at its upper side an uprising projection, a vertically disposed tubular member mounted on said head with its lower end surrounding said projection, said member extending into said chamber space and being formed with an inlet opening communicating with said inlet passage and with a vertically elongated measuring orifice opening to said outlet passage, a floating piston fitting in said tubular member and rising and falling to thereby increase and decrease the free flow area through said orifice as the flow between said passages increases and decreases and means providing restricted communication between the space within said member above said piston and the flow thoroughfare including said passages, port and orifice.

16. In a flow meter, the combination with a meter casing having a vertically disposed piston chamber, an inlet opening to the lower end of said chamber and an outlet communicating with said chamber through a vertically elongated measuring orifice in the wall of said chamber, of a floating piston in said chamber moving up and down therein and thereby increasing and decreasing the free flow area through said orifice on increases and decreases in the fluid flow through the thoroughfare formed by said inlet, outlet and orifice below said piston, means providing restricted communication between said thoroughfare and the upper portion of said chamber whereby said portion forms a dash pot space which receives fluid from and returns it to said thoroughfare as the piston moves up and down, and means for exhibiting the movements of said piston comprising an upwardly extending tubular extension of said casing communicating at its lower end with the upper end of said chamber and closed at its upper end, a magnetic body in said space, a current carrying winding surrounding said extension and in inductive relation with said body and a flexible connection between said piston and magnetic body compelling the latter to share in the vertical movements of the piston but permitting horizontal movement of said body relative to said piston.

17. In a flow meter, the combination with a meter casing having a vertically disposed piston chamber, an inlet opening to the lower end of said chamber and an outlet communicating with said chamber through a vertically elongated measuring orifice in the wall of said chamber, of a floating piston in said chamber moving up and down therein and thereby increasing and decreasing the free flow area through said orifice on increases and decreases in the fluid flow through the thoroughfare formed by said inlet, outlet and the portions of said chamber and orifice below said piston, means providing restricted communication between said thoroughfare and the upper portion of said chamber whereby said portion forms a dash pot space which receives fluid from and returns it to said thoroughfare as the piston moves up and down, and means for exhibiting the movements of said piston comprising an upwardly extending tubular extension of said casing communicating at its lower end with the upper end of said chamber and closed at its upper end, a magnetic body in said space and connected to and moving with said piston, a current carrying winding surrounding said extension and in inductive relation with said body, and a connection including a flexible shaft section between said piston and magnetic body compelling the latter to move vertically with said piston but permitting horizontal movement of said body relative to said piston.

18. In a flow meter for measuring the flow of a heated fluid which is viscous when cold, the combination with a meter casing having a vertically disposed piston chamber, an inlet opening to the lower end of said chamber and an outlet communicating with said chamber through a vertically elongated measuring orifice in the wall of said chamber, of a floating piston in said chamber moving up and down therein and thereby increasing and decreasing the free flow area through said orifice on increases and decreases in the fluid flow through the thoroughfare formed by said inlet, outlet and the portions of said chamber and orifice below said piston, means providing restricted communication between said thoroughfare and the upper portion of said chamber whereby said portion forms a dash pot space which receives fluid from and returns it to said thoroughfare as said piston moves up and down and which receives heat from the fluid flowing through said thoroughfare by conduction through said piston and casing, and auxiliary meter temperature controlling means adjacent the upper portion of said chamber and comprising a part formed with a chamber and means for maintaining a fluid therein separate and differing in temperature from the first mentioned fluid.

19. In a flow meter for measuring the flow of a heated fluid which is viscous when cold, the combination with a meter casing having a vertically disposed piston chamber, an inlet opening to the lower end of said chamber and an outlet communicating with said chamber through a vertically elongated measuring orifice in the wall of said chamber, of a floating piston in said chamber moving up and down therein and thereby increasing and decreasing the free flow area through said orifice on increases and decreases in the fluid flow through the thoroughfare formed by said inlet, outlet and the portions of said chamber and orifice below said piston, means providing restricted communication between said thoroughfare and the upper portion of said chamber whereby said portion forms a dash pot space which receives fluid from and returns it to said thoroughfare as the piston moves up and down and which receives heat from the fluid flowing through said thoroughfare by conduction through said piston and casing, an upwardly extending tubular casing extension closed at its upper end, an auxiliary meter temperature controlling casing part interposed between said casing and extension and comprising a passage through which said extension communicates with the upper end of said chamber and means for modifying the temperature of the fluid within said passage, a magnetic body in said extension and connected to and moving with said piston, and a current carrying winding surrounding said extension and in inductive relation with said body.

20. In a flow meter for measuring the flow of a heated fluid which is viscous when cold, the combination with a meter casing having a vertically disposed piston chamber, an inlet opening to the lower end of said chamber and an outlet communicating with said chamber through a vertically elongated measuring orifice in the wall of said chamber, of a floating piston in said chamber moving up and down therein and thereby increasing and decreasing the free flow area through said orifice on increases and decreases in the fluid flow through the thoroughfare formed by said inlet, outlet and the portions of said chamber and orifice below said piston, means providing restricted communication between said thoroughfare and the upper portion of said chamber whereby said portion forms a dash pot space which receives fluid from and returns it to said thoroughfare as the piston moves up and down and which receives heat from the fluid flowing through said thoroughfare by conduction through said piston and casing, an upwardly extending tubular casing extension closed at its upper end and adapted for attachment to said casing with its lower end in communication with the upper end of said chamber, a magnetic body in said extension and connected to and moving with said piston, a current carrying winding surrounding said extension and in inductive relation with said body, and an auxiliary meter temperature controlling casing part comprising a passage and means for modifying the temperature of the fluid within said passage, said part being adapted for interposition between said casing extension with the latter in communication with the upper end of said chamber through said passage, and said casing, casing part and extension having engaging surfaces adapted to permit the attachment of said extension to said casing directly or through said casing part accordingly as the temperature modifying effect of said part is or is not desired.

ANDREW J. FISHER.